(12) United States Patent
Kishimoto et al.

(10) Patent No.: US 9,682,659 B2
(45) Date of Patent: Jun. 20, 2017

(54) PACKAGE TRAY SUPPORTING STRUCTURE

(71) Applicant: TOYOTA JIDOSHA KABUSHIKI KAISHA, Toyota-shi (JP)

(72) Inventors: Masami Kishimoto, Susono (JP); Ayako Okano, Yokosuka (JP); Naoyuki Goto, Aichi-gun (JP); Kohei Noshiro, Suntou-gun (JP); Tetsuhiro Mifuchi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/068,154

(22) Filed: Mar. 11, 2016

(65) Prior Publication Data

US 2016/0264058 A1 Sep. 15, 2016

(30) Foreign Application Priority Data

Mar. 11, 2015 (JP) .................. 2015-048051

(51) Int. Cl.
*B60R 13/00* (2006.01)
*B60R 5/04* (2006.01)

(52) U.S. Cl.
CPC .................. *B60R 5/044* (2013.01)

(58) Field of Classification Search
CPC ...................................... B60R 5/044
See application file for complete search history.

(56) References Cited

U.S. PATENT DOCUMENTS

2012/0133171 A1* 5/2012 Honda .............. B60R 5/044
296/37.16

FOREIGN PATENT DOCUMENTS

JP 2012-116317 6/2012
JP 2014-148288 8/2014

* cited by examiner

*Primary Examiner* — Lori L Lyjak
(74) *Attorney, Agent, or Firm* — Oblon, McClelland, Maier & Neustadt, L.L.P.

(57) ABSTRACT

A package tray supporting structure includes: a first hinge portion; a second hinge portion provided separately above the first hinge portion; a first hinge receiving portion provided at a side surface on a vehicle front side of the package tray, and held between a first surface of the second hinge portion and an outer peripheral surface of the first hinge portion when the package tray is in a horizontal position; and a second hinge receiving portion provided at the side surface on the vehicle front side of the package tray separately from the first hinge receiving portion toward a vehicle rear side and contacts the second surface of the second hinge portion when the package tray is in the horizontal position.

5 Claims, 12 Drawing Sheets

PACKAGE TRAY SUPPORTING STRUCTURE

INCORPORATION BY REFERENCE

The disclosure of Japanese Patent Application No. 2015-048051 filed on Mar. 11, 2015 including the specification, drawings and abstract is incorporated herein by reference in its entirety.

BACKGROUND OF THE INVENTION

1. Field of the Invention

The invention relates to a package tray supporting structure, and more particularly, to a supporting structure for a package tray for use to hide luggage that is loaded in a luggage compartment provided behind a rear seat.

2. Description of Related Art

In hatchback-type or wagon-type automobiles in which a luggage compartment is provided behind a rear seat, a package tray that makes luggage loaded in the luggage compartment invisible from outside has been developed.

As the package tray for use to hide the rear luggage compartment, a package tray supporting structure is disclosed that can prevent or suppress application of a load to a package tray trim when a backdoor is closed (for example, see Japanese Patent Application Publication No. 2012-116317).

As shown in FIG. 11, the package tray supporting structure includes a first hinge 6 having a guide portion 60 that projects to a vehicle interior side and supports a vehicle front-side end portion of a package tray 5 on an upper surface of the guide portion 60 in order to support the package tray 5 pivotally with respect to a vehicle body side.

The guide portion 60 of the first hinge 6 has a first curved surface 61 that is provided on the upper surface, and an outline of which forms an arc shape bulging to an outer side of the guide portion 60 in side view, a rising surface 62 that rises upward from a vehicle front-side end portion of the first curved surface 61, and a second curved surface 63 that is extended downward to a vehicle front side from an upper-side end portion of the rising surface 62, and an outline of which forms a curved shape.

The package tray 5 has an abutment portion 51 that is a curved surface provided at the vehicle front-side end portion and in abutment with the first curved surface 61 in a state in which the curved surface can be inclined to a front side and a rear side of a vehicle in side view, and an extended portion 52 that is extended in a state in which the extended portion 52 is curved downward to the vehicle front side from the abutment portion 51 such that an outline of the extended portion 52 forms an arc shape. A center position that is the center of pivoting of the package tray 5 exists directly under the guide portion 60 of the first hinge.

The package tray supporting structure also includes a second hinge 7 that is provided apart from the guide portion 60 of the first hinge 6, and prevents a lift of the vehicle front-side end portion of the package tray 5 by projecting to the vehicle interior side in a shape in which an outline of the second hinge 7 forms a substantially oval shape with a line connecting a rear upper side and a front lower side as a long axis in side view.

In the package tray supporting structure having the above configuration, the extended portion 52 of the package tray 5 is configured to be held between the second curved surface 63 of the guide portion 60 of the first hinge 6 and the second hinge 7 in a thickness direction of the extended portion 52. Thus, the package tray 5 can pivot when the abutment portion 51 moves to the vehicle front side and the vehicle rear side on the first curved surface 61 of the guide portion 60 of the first hinge 6 while changing an inclination of the abutment portion 51.

Also, as the package tray for use to hide the rear luggage compartment, a package tray mounting structure is disclosed that can suppress occurrence of an event in which a load is applied to a shaft portion when a package tray in an inclined position is pressed to a vehicle front side (for example, see Japanese Patent Application Publication No. 2014-148288).

As shown in FIG. 12, the package tray mounting structure includes a hinge pin 9 that projects to a vehicle interior side from a side wall of a luggage compartment, and to which a package tray 8 is pivotally mounted, and a hinge collar 80 that is separately provided on a side wall portion of the package tray 8, and is pivotally mounted to the hinge pin 9 opposed to the hinge collar 80.

A bearing recessed portion 81a to which the hinge pin 9 is fitted is provided in the hinge collar 80. The bearing recessed portion 81a is formed so as to open downward when the package tray 8 is in a horizontal position. Also, a locking portion 81b that projects toward an opening-end rear portion that is a portion on a vehicle rear side in an opening end of the bearing recessed portion 81a when the package tray 8 is in the horizontal position, and that can be locked to a vehicle front-side end portion of the hinge pin 9 from below is provided at an opening-end front portion that is a portion on the vehicle front side in the opening end.

The hinge pin 9 cannot be disengaged outside of the bearing recessed portion 81a through a gap between a projecting end of the locking portion 81b and the opening-end rear portion when the package tray 8 is in the horizontal position, and can be disengaged outside of the bearing recessed portion 81a through the gap between the projecting end of the locking portion 81b and the opening-end rear portion when the package tray 8 is in the inclined position.

In the package tray mounting structure having the above configuration, the locking portion of the hinge collar 80 can be locked to the vehicle front-side end portion of the hinge pin from below when the package tray 8 is in the horizontal position. When the package tray 8 in the horizontal position is displaced upward, the locking portion is locked to the vehicle front-side end portion of the hinge pin from below. It is thus possible to restrict the upward displacement of the package tray.

Also, in the package tray in the inclined position, the hinge pin 9 can be disengaged from the bearing recessed portion 81a through the gap between the projecting end of the locking portion 81b of the hinge collar 80 and the opening-end rear portion. Thus, when the package tray 8 in the inclined position is pushed to the vehicle front side, the hinge pin 9 can be disengaged outside of the bearing recessed portion 81a.

Note that both of the above package trays are rotatable in a direction in which a vehicle rear-side end portion is raised in association with an action of opening a backdoor (not shown).

SUMMARY OF THE INVENTION

However, in the aforementioned package tray supporting structure shown in FIG. 11, when the vehicle rear-side end portion of the package tray 5 receives an external force of a certain level or more in a fully-open state of the backdoor, the force is also transmitted to the vehicle front-side end portion of the package tray 5. Since the extended portion 52 of the package tray 5 is engaged with the second hinge 7 even when the package tray 5 is in the inclined position, the external force cannot be released. Thus, there is a possibility that an engaged portion between the extended portion and the second hinge, and the package tray itself are damaged.

Also, in the aforementioned package tray mounting structure shown in FIG. 12, the hinge pin 9 cannot be disengaged outside of the bearing recessed portion 81*a* through the gap between the projecting end of the locking portion 81*b* and the opening-end rear portion when the package tray 8 is in the horizontal position, and can be disengaged outside of the bearing recessed portion 81*a* through the gap between the projecting end of the locking portion 81*b* and the opening-end rear portion when the package tray 8 is in the inclined position. Therefore, especially when the package tray 8 is in the horizontal position, a gap is formed between the bearing recessed portion 81*a* of the hinge collar 80 and the hinge pin 9. Thus, there is a possibility that the package tray 8 rattles and abnormal noise is generated due to the rattling while a vehicle is running.

The invention provides a package tray supporting structure that can prevent damage to a package tray and a hinge portion even when the package tray receives an external force applied from a vehicle rear side to a vehicle front side when the package tray is in an inclined position, and that can also prevent rattling of the package tray and generation of abnormal noise due to the rattling while a vehicle is running.

An aspect of the invention provides a package tray supporting structure for supporting a package tray pivotally with respect to a vehicle body side between a horizontal position and a predetermined inclined position, the package tray hiding luggage that is loaded in a luggage compartment provided behind a rear seat, each of opposite side surface portions on a vehicle front side of the package tray being pivotally mounted to the vehicle body. The package tray is disposed along a horizontal direction in the horizontal position. A vehicle rear-side end portion of the package tray is disposed at a higher position than a vehicle front-side end portion of the package tray in the predetermined inclined position. The package tray supporting structure according to the aspect of the invention includes: a first hinge portion that is provided on the vehicle body side, and projects to a vehicle interior side; a second hinge portion that is provided on the vehicle body side, and projects to the vehicle interior side, the second hinge portion including a first surface that is provided separately from the first hinge portion above the first hinge portion, and a second surface that is located more separately from the first hinge portion than the first surface; a first hinge receiving portion that is provided at the side surface portion on the vehicle front side of the package tray, and is held between the first surface and an outer peripheral surface of the first hinge portion when the package tray is in the horizontal position; and a second hinge receiving portion that is provided at the side surface portion on the vehicle front side of the package tray separately from the first hinge receiving portion toward a vehicle rear side, the second hinge receiving portion being in abutment with the second surface when the package tray is in the horizontal position. The second hinge portion is configured to allow the package tray to be disengaged from the first hinge portion and the second hinge portion when the package tray is rotated to the inclined position from the horizontal position.

In the above aspect of the invention, the first hinge receiving portion may be provided so as to continuously slides on the outer peripheral surface of the first hinge portion when the package tray performs a pivoting action between the horizontal position and the inclined position, and the second hinge receiving portion may be provided so as to continuously slides on the second surface of the second hinge portion when the package tray performs the pivoting action between the horizontal position and the inclined position.

In the above aspect of the invention, the first hinge portion may have a cylindrical shape, the second hinge portion may have a substantially fan shape having a center angle of predetermined magnitude, the first surface may have an arc surface shape, and the second surface may have an arc surface shape that has a larger radius than that of the arc surface shape of the first surface.

In the package tray supporting structure according to the above aspect, in order to support the package tray for use to hide the luggage that is loaded in the luggage compartment provided behind the rear seat pivotally with respect to the vehicle body side between the horizontal position in which the package tray is disposed along the horizontal direction and the predetermined inclined position in which the vehicle rear-side end portion of the package tray is disposed at a higher position than the vehicle front-side end portion of the package tray, each of the opposite side surface portions on the vehicle front side of the package tray is pivotally mounted to the vehicle body.

Note that "hold" in the present specification means supporting in a sandwiched state. Also, "slide" means moving in a contact state.

In accordance with the aspect, when the package tray is in the horizontal position, the first hinge receiving portion is vertically in abutment with the outer peripheral surface of the first hinge portion and the first surface of the second hinge portion. Also, the first hinge receiving portion is horizontally in abutment with the first surface of the second hinge portion and the second hinge receiving portion is horizontally in abutment with the second surface of the second hinge portion. Therefore, it is possible to prevent rattling of the package tray, and generation of abnormal noise due to the rattling while a vehicle is running.

Moreover, when an occupant opens a backdoor and the package tray is moved from the horizontal position to the inclined position in association, the second hinge receiving portion continuously slides on the second surface of the second hinge portion, and the first hinge receiving portion continuously slides on the outer peripheral surface of the first hinge portion. However, since the first hinge receiving portion and the second hinge receiving portion are provided separately from each other, the package tray becomes disengageable from the first hinge portion and the second hinge portion when the package tray is rotated to the inclined position from the horizontal position. Therefore, even when the vehicle rear-side end portion of the package tray receives an external force of a certain level or more, the package tray is disengaged toward the vehicle front side. It is thus possible to release the external force, and prevent damage to an engaged portion between the hinge portion and the hinge receiving portion, and the package tray itself.

In the above aspect in which the first surface has an arc surface shape, and the second surface has an arc surface shape that has a larger radius than that of the arc surface shape of the first surface, an axis center of the first hinge portion and an arc center of the first surface may be set to be concentric with each other, and a position of an arc center of the second surface may be set to be higher than a position of the arc center of the first surface.

In accordance with the above aspect, the position of the arc center of the second surface of the second hinge portion is set to be higher than the position of the arc center of the first surface of the second hinge portion. Thus, even when the second hinge receiving portion of the package tray moves along the second surface of the second hinge portion with the package tray being rotated to the inclined position from the horizontal position, it is possible to prevent a gap between the second surface of the second hinge portion and the first hinge receiving portion from being increased. Therefore, it is possible to prevent an occupant from catching his/her finger pinched in the gap, that is, a so-called finger pinch.

In the above aspect, a minimum interval between the first hinge receiving portion and the second hinge receiving portion may be set such that the package tray is disengaged from the first hinge portion and the second hinge portion with an upper end portion of the luggage as a fulcrum when an external force is applied to the vehicle rear-side end portion of the package tray downwardly from above in a case in which a height position of the luggage is higher than a position of an axis center of the first hinge portion by a predetermined height dimension.

In accordance with the above aspect, in a case in which the backdoor has a gentle inclination angle, the backdoor pushes the vehicle rear-side end portion of the package tray when the backdoor is closed. However, even when the height position of the luggage loaded in the luggage compartment is higher than the position of the axis center of the first hinge portion by a predetermined height dimension, it is possible to prevent damage to the package tray in this case since the minimum interval between the first hinge receiving portion and the second hinge receiving portion is set such that the package tray is disengaged from the first hinge portion and the second hinge portion with the upper end portion of the luggage as a fulcrum.

In accordance with the package tray supporting structure according to the aspect of the invention, it is possible to prevent damage to the package tray and the hinge portion even when the package tray receives an external force applied from the vehicle rear side to the vehicle front side when the package tray is in the inclined position, and also prevent rattling of the package tray and generation of abnormal noise due to the rattling while the vehicle is running.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment for carrying out a package tray supporting structure of the invention will be described with reference to the drawings. Note that opposite side surface portions of a package tray 2 to which the invention is applied are basically configured to be symmetrical with respect to the center in a vehicle width direction, and thus, the package tray supporting structure will be described by showing only one of the side surface portions of the package tray 2 in FIGS. 1, 2, 5 to 10.

Also, directions are indicated by arrows in the respective drawings used in the embodiment for carrying out the invention. The directions indicate directions viewed from an occupant seated in a driver seat. An arrow UP indicates a vehicle upward direction, an arrow FR indicates a vehicle front direction, an arrow RH indicates a vehicle-width right direction, and an arrow RR indicates a vehicle rear direction.

Moreover, respective arrows indicate directionality when respective parts are incorporated in a vehicle body.

In the package tray supporting structure of the invention, in order to support the package tray 2 for use to hide luggage that is loaded in a luggage compartment provided behind a rear seat pivotally with respect to a vehicle body side between a horizontal position in which the package tray 2 is disposed along a horizontal direction and a predetermined inclined position in which a vehicle rear-side end portion of the package tray 2 is disposed at a higher position than a vehicle front-side end portion of the package tray 2, each of the opposite side surface portions on a vehicle front side of the package tray 2 is pivotally mounted to the vehicle body.

Figure 1A:
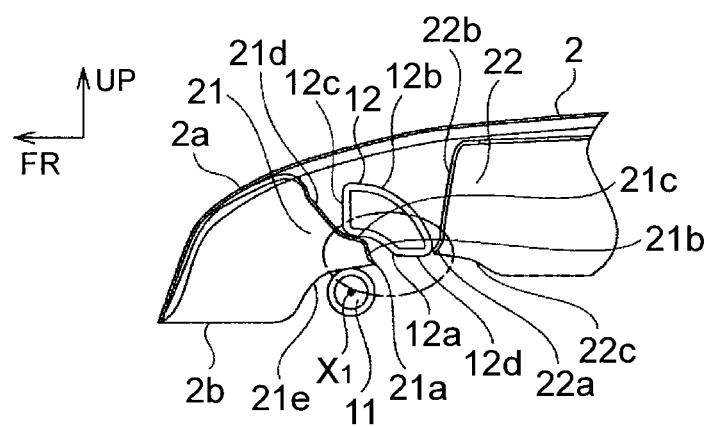
FIG. 1A is a side view of a vehicle front side of a package tray according to a preferred embodiment of a package tray supporting structure of the invention, and is a view in which the package tray is in a horizontal position.
Figure 1B:
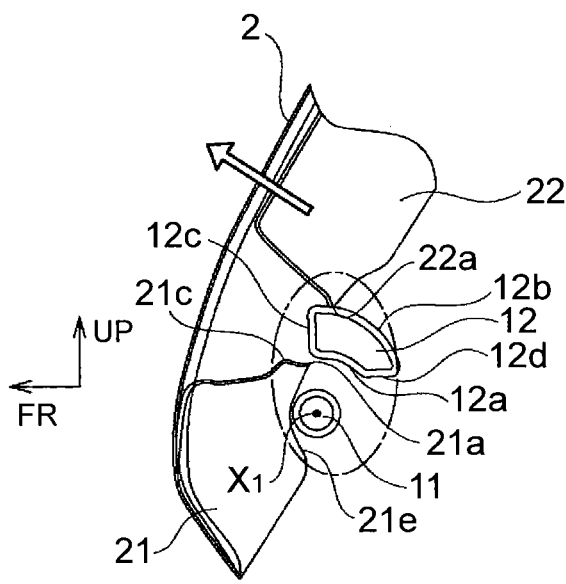
FIG. 1B is a side view of the vehicle front side of the package tray according to the preferred embodiment of the package tray supporting structure of the invention, and is a view in which the package tray is in an inclined position.
Figure 2A:
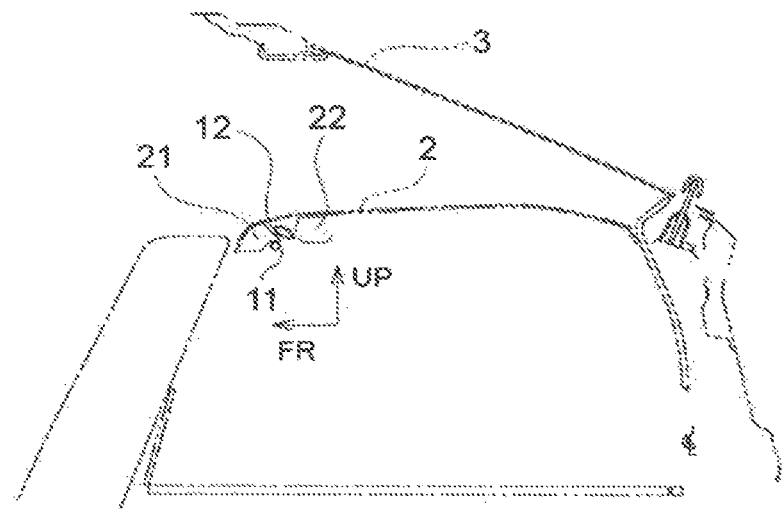
FIG. 2A is a side view simply illustrating a rear of a vehicle to which the package tray supporting structure in FIGS. 1A, 1B is applied, and is a view in which the package tray is in the horizontal position.
Figure 2B:
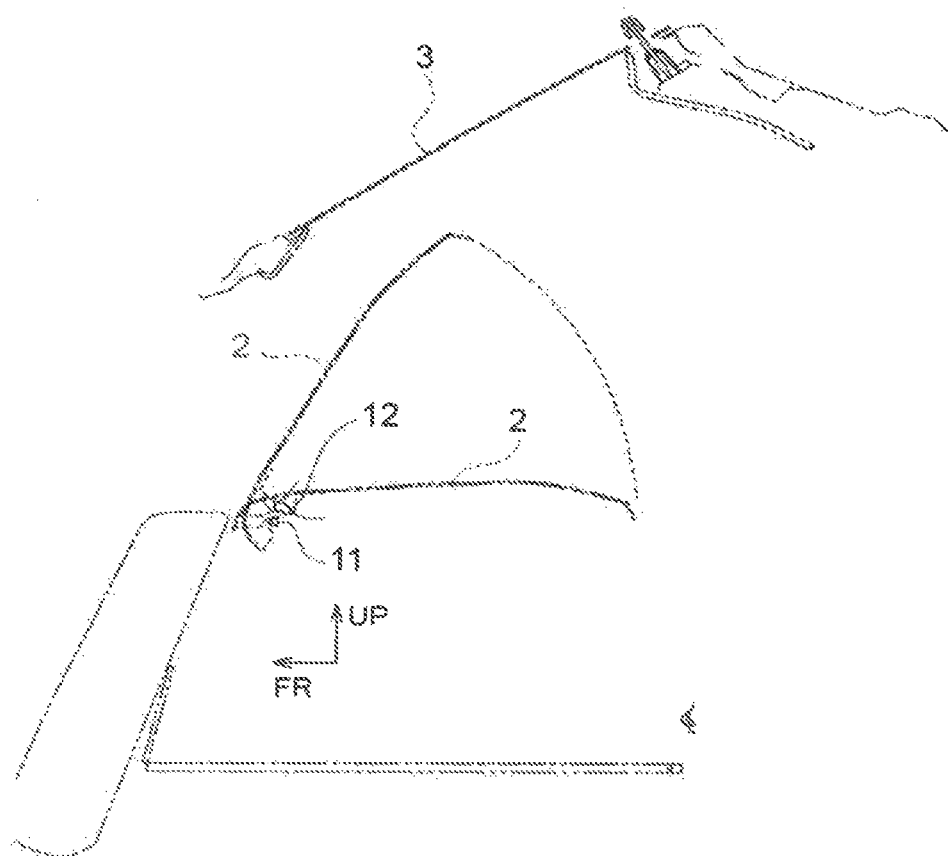
FIG. 2B is a side view simply illustrating the rear of the vehicle to which the package tray supporting structure in FIGS. 1A, 1B is applied, and is a view in which the package tray is in the inclined position.
Figure 3:
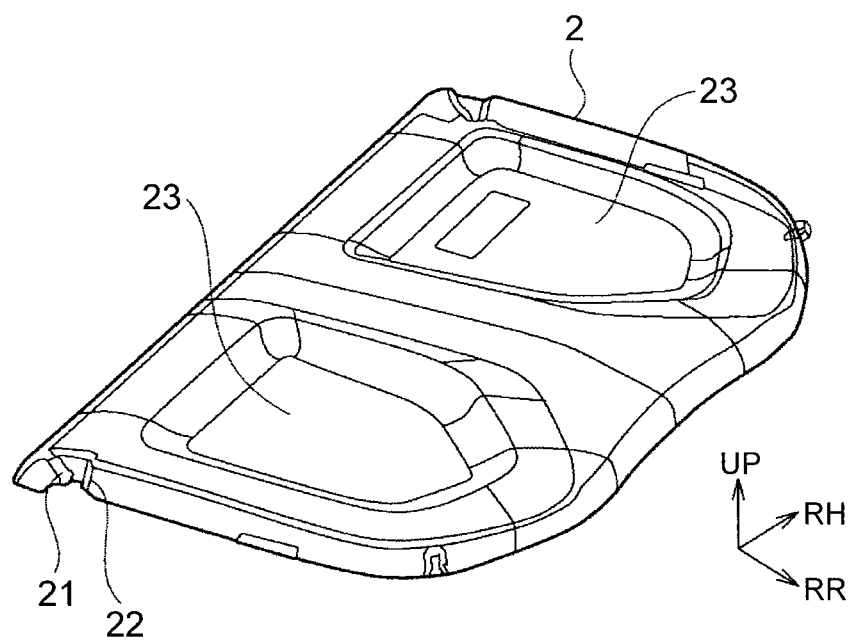
FIG. 3 is an overall perspective view of the package tray to which the invention is applied.
Figure 4:
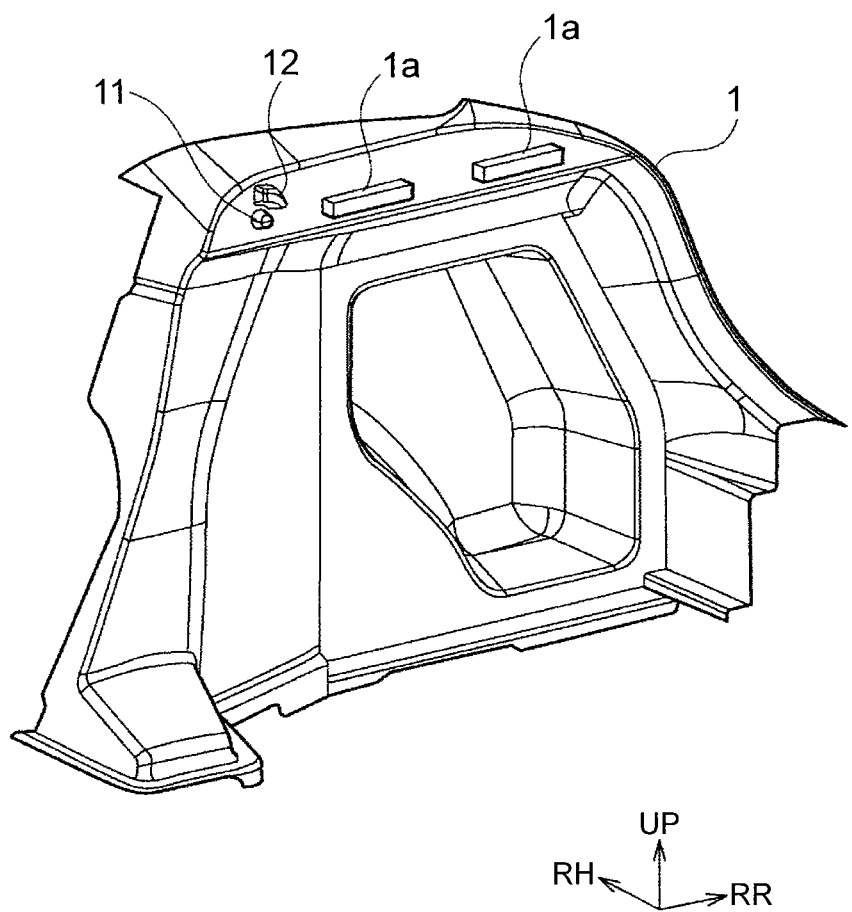
FIG. 4 is an overall perspective view illustrating a deck side trim to which the package tray supporting structure of the invention is applied.

As shown in FIG. 3, the package tray 2 is configured into a thin substantially-box shape by using a thermoplastic resin. For example, a pocket for small items is formed on an upper surface. For example, a deck side trim 1 is employed as the vehicle body side that pivotally supports the package tray 2. The deck side trim 1 is provided at a side portion in the vehicle width direction within a vehicle interior, and constitutes a vehicle interior side wall as shown in FIG. 4. A support portion 1a that supports the package tray 2 in the horizontal position is also provided in the deck side trim 1.

The supporting structure for the package tray as described above includes a first hinge portion 11 and a second hinge portion 12 that are provided in the deck side trim 1, and a first hinge receiving portion 21 and a second hinge receiving portion 22 that are provided at the side surface portion on the vehicle front side of the package tray 2 as shown in FIGS. 1A, 1B, 2A, 2B.

The first hinge portion 11 is formed in a cylindrical shape projecting to the vehicle interior side. The second hinge portion 12 is provided separately from the first hinge portion 11 within a short distance above the first hinge portion 11, and is formed in a substantially fan shape so as to project to the vehicle interior side. The second hinge portion 12 having the substantially fan shape has a first arc surface 12a located on the first hinge portion 11-side, a second arc surface 12b located more separately from the first hinge portion 11 than the first arc surface 12a and having a larger radius value than that of the first arc surface 12a. The substantially fan shape of the second hinge portion 12 has a center angle (an opening angle) of predetermined magnitude. The substantially fan shape is obtained by cutting off a center side of a fan shape along an arc (the first arc surface 12a) that is concentric with the fan shape, and cutting the fan shape based on the center angle.

Also, in the second hinge portion 12 having the substantially fan shape, a cut surface 12c on a left side is disposed along a substantially vertical direction, and a cut surface 12d on a right side is disposed along the substantially horizontal direction as shown in FIGS. 1. In the second hinge portion 12, the cut surface 12c on the left side is disposed directly above an axis center $X_1$ of the first hinge portion 11 within a short distance, and the cut surface 12d on the right side is disposed obliquely above the axis center $X_1$ toward a vehicle rear side as shown in FIGS. 1.

Since the first hinge portion 11 and the second hinge portion 12 have the simple shapes as described above, the first hinge portion 11 and the second hinge portion 12 can be integrated with the deck side trim 1. That is, the deck side trim 1 with which the first hinge portion 11 and the second hinge portion 12 are integrated can be molded by using a single mold for injection molding.

The first hinge receiving portion 21 is formed so as to be held between the first arc surface 12a of the second hinge portion 12 and an outer peripheral surface of the first hinge portion 11 when the package tray 2 is in the horizontal position, and to continuously slide on the outer peripheral surface of the first hinge portion 11 when the package tray 2 performs a pivoting action between the horizontal position and the inclined position.

The second hinge receiving portion 22 is provided separately from the first hinge receiving portion 21 toward the vehicle rear side. The second hinge receiving portion 22 is formed so as to continuously slide on the second arc surface 12b of the second hinge portion 12 when the package tray 2 performs a pivoting action between the horizontal position and the inclined position.

Opposed portions of the first hinge receiving portion 21 and the second hinge receiving portion 22 are specifically formed in a claw shape. The first hinge receiving portion 21 has, for example, a first inclined surface 21b, a first curved surface 21c, a second inclined surface 21d, and a second curved surface 21e. The first inclined surface 21b is composed of an inclined surface inclined upward to the vehicle front side from a claw distal end portion 21a in side view. The first curved surface 21c is formed to be extended from an upper-side end portion of the first inclined surface 21b and has an arc shape bulging upward. The second inclined surface 21d is formed to be extended from a vehicle front-side end portion of the first curved surface 21c and is composed of an inclined surface inclined upward to the vehicle front side. The second curved surface 21e is extended downward to the vehicle front side from the claw distal end portion 21a, and an outline of which forms a curved shape. Also, an upper-side end portion of the second inclined surface 21d is provided continuously to an upper surface 2a of the package tray 2, and a lower-side end portion of the second curved surface 21e is provided continuously to a lower surface 2b of the package tray 2. Note that "extended" in the present specification means coming out in a stretched state. Also, "provided continuously" in the present specification means connection in a continuous state.

Therefore, in the first hinge receiving portion 21, the first curved surface 21c and the second curved surface 21e are held between the first arc surface 12a of the second hinge portion 12 and the outer peripheral surface of the first hinge portion 11 when the package tray 2 is in the horizontal position. The second curved surface 21e continuously slides on the outer peripheral surface of the first hinge portion 11 when the package tray 2 performs the pivoting action between the horizontal position and the inclined position.

The second hinge receiving portion 22 has, for example, an inclined surface 22b and a curved surface 22c. The inclined surface 22b that is composed of an inclined surface inclined upward to the vehicle rear side from a claw distal end portion 22a in side view. The curved surface 22c is extended downward to the vehicle rear side from the claw distal end portion 22a, and an outline of which forms a curved shape are formed. Also, an upper-side end portion of the inclined surface 22b is provided continuously to the upper surface 2a of the package tray 2, and a lower-side end portion of the curved surface 22c is provided continuously to the lower surface 2b of the package tray 2.

Therefore, in the second hinge receiving portion 22, the claw distal end portion 22a continuously slides on the second arc surface 12b of the second hinge portion 12 when the package tray 2 performs the pivoting action between the horizontal position and the inclined position.

Also, the second hinge portion 12 is formed such that the package tray 2 becomes disengageable from the first hinge portion 11 and the second hinge portion 12 when the package tray 2 is rotated to the inclined position from the horizontal positon. To be more specific, in the second hinge portion 12 having the substantially fan shape, the cut surface 12c on the left side is disposed along the substantially vertical direction, the cut surface 12d on the right side is disposed along the substantially horizontal direction, and the cut surface 12c on the left side is disposed directly above the axis center $X_1$ of the first hinge portion 11 within a short distance as shown in FIGS. 1. Thus, the respective claw distal end portions 21a, 22a of the first hinge receiving portion 21 and the second hinge receiving portion 22 of the package tray 2 can be disengaged from the cut surface 12c on the left side of the second hinge portion 12 having the substantially fan shape and the outer peripheral surface of the first hinge portion 11.

Also, the axis center $X_1$ of the first hinge portion 11 and an arc center $X_2$ of the first arc surface 12a of the second hinge portion 12 are set to be concentric with each other. A position of an arc center $X_3$ of the second arc surface 12b of the second hinge portion 12 is set to be higher than a position of the arc center $X_2$ of the first arc surface 12a of the second hinge portion 12 (see FIG. 5).

Figure 7:
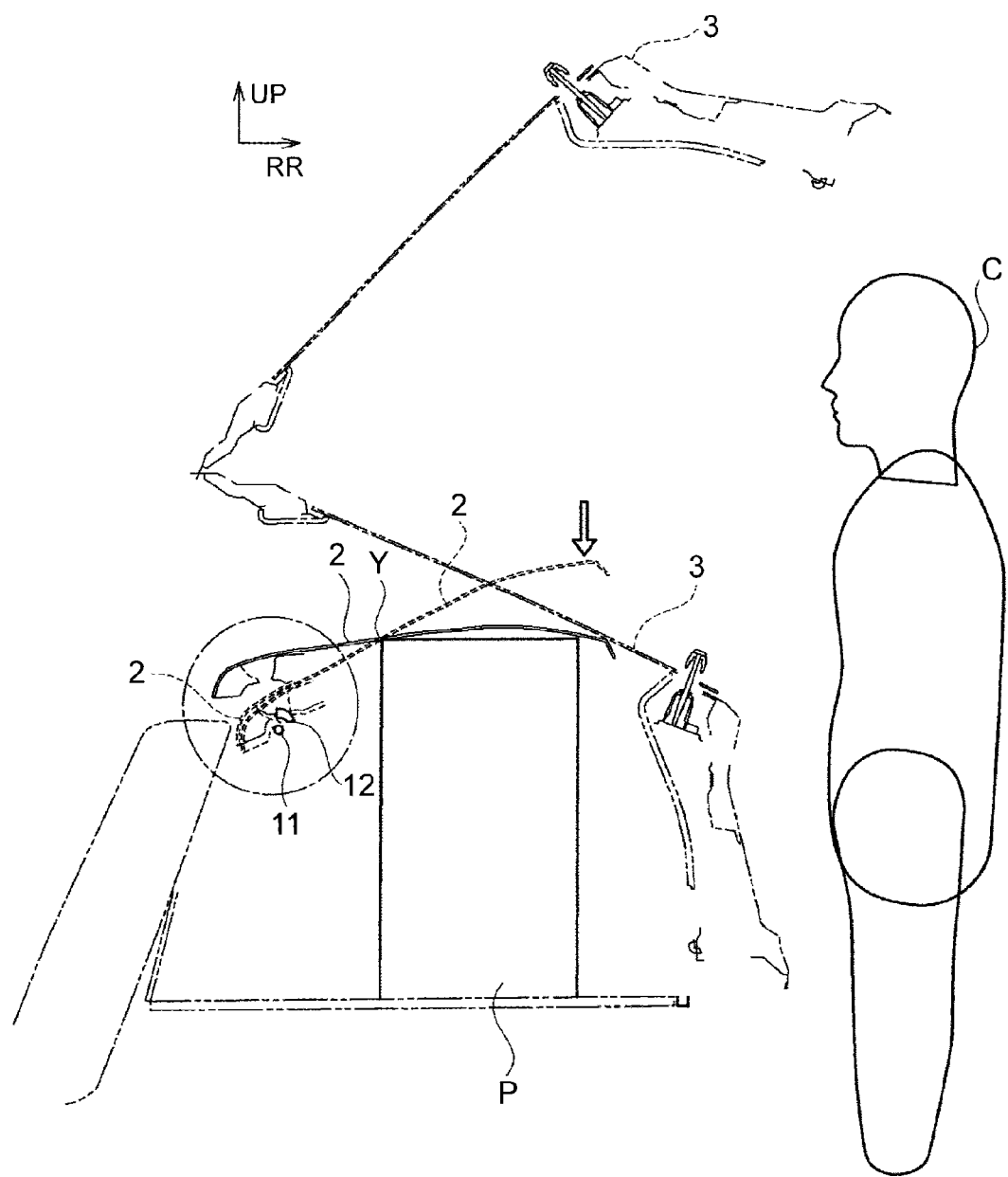
FIG. 7 is a side view simply illustrating the rear of the vehicle to which the package tray supporting structure of the invention is applied, and is a view illustrating movement of the package tray when a backdoor is closed in a case in which luggage loaded in a luggage compartment has a large height.

Also, a minimum interval between the first hinge receiving portion 21 and the second hinge receiving portion 22 is set such that the package tray 2 is disengaged from the first hinge portion 11 and the second hinge portion 12 with an upper end portion Y of luggage P loaded in the luggage compartment as a fulcrum when an external force is applied to the vehicle rear-side end portion of the package tray 2 downwardly from above in a case in which a height position of the luggage P is higher than a position of the axis center $X_1$ of the first hinge portion 11 by a predetermined height dimension (see FIG. 7). To be more specific, the minimum interval is a gap between the claw distal end portion 21a of the first hinge receiving portion 21 and the claw distal end portion 22a of the second hinge receiving portion 22.

Figure 5:
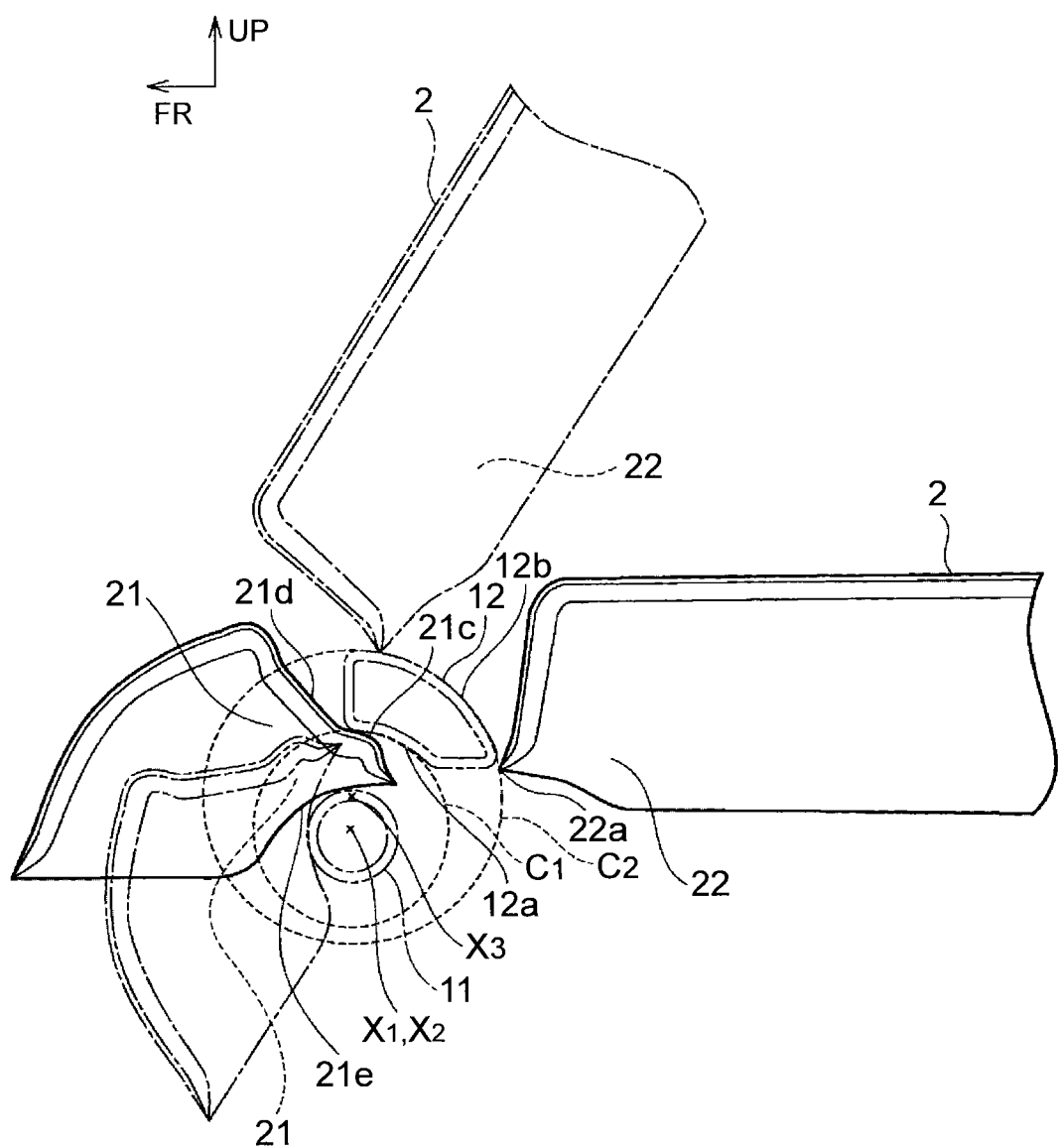
FIG. 5 is a side view of the vehicle front side of the package tray in the package tray supporting structure of the invention, and is a view illustrating a pivoting path of the package tray.

The pivoting action of the package tray by the package tray supporting structure of the invention having the above configuration will be described below based on FIG. 5. In FIG. 5, the package tray 2 indicated by a solid line represents the horizontal position, the package tray 2 indicated by an alternate long and short dash line and an alternate long and two short dashes line represents the inclined position. A small circle $C_1$ indicated by a dotted line represents a virtual movement path through which the first hinge receiving portion 21 moves along the outer peripheral surface of the first hinge portion 11. A large circle $C_2$ indicated by a dotted line represents a virtual movement path through which the second hinge receiving portion 22 moves along the second arc surface 12b of the second hinge portion 12.

In a description of various actions of the package tray 2 mentioned below, the vehicle rear-side end portion of the package tray 2 is coupled to a backdoor 3 by a coupling member (not shown) in every case. Therefore, the package tray 2 assumes the inclined position in which the vehicle rear-side end portion is raised in association with an action of opening the backdoor 3. The luggage compartment can be thereby opened.

First, when the package tray 2 is in the horizontal position, the first hinge receiving portion 21 is vertically in abutment with the outer peripheral surface of the first hinge portion 11 and the first arc surface 12a of the second hinge portion 12, and is horizontally in abutment with the first arc surface 12a of the second hinge portion 12. Also, the second hinge receiving portion 22 is horizontally in abutment with the second arc surface 12b of the second hinge portion 12.

To be more specific, the first curved surface 21c and the second curved surface 21e of the first hinge receiving portion 21 are vertically in abutment with the outer peripheral surface of the first hinge portion 11 and the first arc surface 12a of the second hinge portion 12. A connection point between the first curved surface 21c and the second inclined surface 21d of the first hinge receiving portion 21 is horizontally in abutment with the first arc surface 12a of the second hinge portion 12. Also, the claw distal end portion 22a of the second hinge receiving portion 22 is horizontally in abutment with the second arc surface 12b of the second hinge portion 12.

Therefore, it is possible to prevent rattling of the package tray 2, and generation of abnormal noise due to the rattling while a vehicle is running.

Next, when an occupant opens the backdoor 3 and the package tray 2 is moved from the horizontal position to the inclined position in association, the second hinge receiving portion 22 continuously slides on the second arc surface 12b of the second hinge portion 12, and the first hinge receiving portion 21 continuously slides on the outer peripheral surface of the first hinge portion 11. However, since the first hinge receiving portion 21 and the second hinge receiving portion 22 are provided separately from each other, the package tray 2 become disengageable from the first hinge portion 11 and the second hinge portion 12 when the package tray 2 is rotated to the inclined position from the horizontal position.

To be more specific, the claw distal end portion 22a of the second hinge receiving portion 22 continuously slides on the second arc surface 12b of the second hinge portion 12, and the second curved surface 21e of the first hinge receiving portion 21 continuously slides on the outer peripheral surface of the first hinge portion 11. However, since the claw distal end portion 21a of the first hinge receiving portion 21 and the claw distal end portion 22a of the second hinge receiving portion 22 are provided separately from each other, the package tray 2 become disengageable from the first hinge portion 11 and the second hinge portion 12 when the package tray 2 is rotated to the inclined position from the horizontal position.

Therefore, when the vehicle rear-side end portion of the package tray 2 receives an external force of a certain level or more, the package tray 2 is disengaged toward the vehicle front side. It is thus possible to release the external force, and prevent damage to an engaged portion between the hinge portion and the hinge receiving portion, and the package tray itself.

The axis center $X_1$ of the first hinge portion 11 and the arc center $X_2$ of the first arc surface 12a of the second hinge portion 12 are set to be concentric with each other, and the position of the arc center $X_3$ of the second arc surface 12b of the second hinge portion 12 is set to be higher than the position of the arc center $X_2$ of the first arc surface 12a of the second hinge portion 12. Thus, even when the second hinge receiving portion 22 of the package tray 2 moves along the second arc surface 12b of the second hinge portion 12 with the package tray 2 being moved from the horizontal position to the inclined position, it is possible to prevent a gap between the second arc surface 12b of the second hinge portion 12 and the first hinge receiving portion 21 from being increased.

To be more specific, even when the claw distal end portion 22a of the second hinge receiving portion 22 of the package tray 2 moves along the second arc surface 12b of the second hinge portion 12, it is possible to prevent a gap between the second arc surface 12b of the second hinge portion 12 and the first curved surface 21c of the first hinge receiving portion 21 from being increased. Therefore, it is possible to prevent an occupant from catching his/her finger pinched in the gap.

When the arc center $X_3$ of the second arc surface 12b of the second hinge portion 12 and the arc center $X_2$ of the first arc surface 12a are concentric with each other, the gap between the second arc surface 12b of the second hinge portion 12 and the first curved surface 21c of the first hinge receiving portion 21 is increased. Thus, a possibility of the finger pinch is increased.

Figure 6:
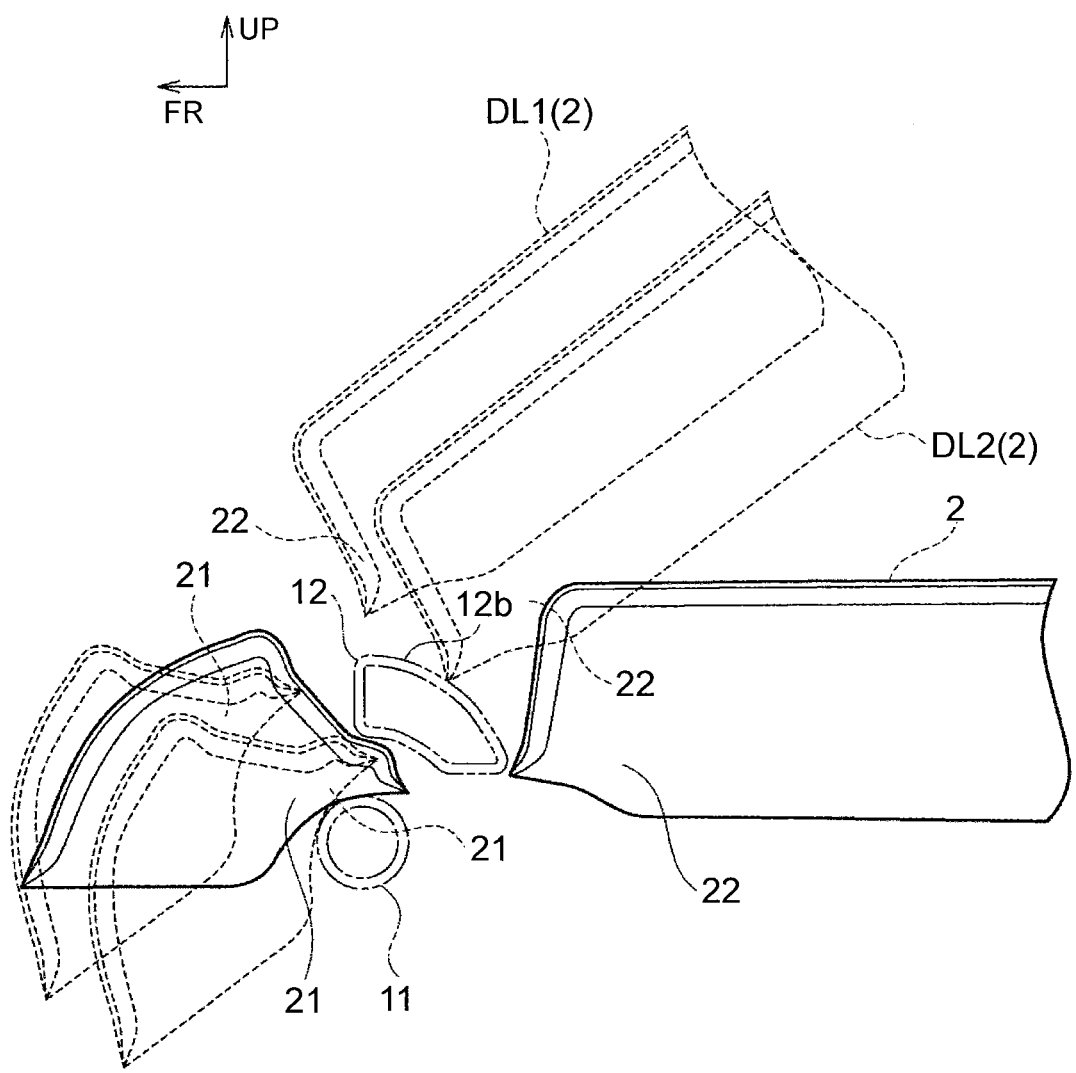
FIG. 6 is a side view of the vehicle front side of the package tray in the package tray supporting structure of the invention, and is a view illustrating an attachment aspect of the package tray.

Next, an attachment aspect when the package tray 2 is attached to the first hinge portion 11 and the second hinge portion 12 will be described based on FIG. 6. In FIG. 6, the package tray 2 indicated by a dotted line DL1 represents a state before attachment, the package tray 2 indicated by a dotted line DL2 represents a state during the attachment, and the package tray 2 indicated by a solid line represents a state in which the attachment is completed.

In order to attach the package tray 2 to the first hinge portion 11 and the second hinge portion 12, the package tray 2 is first moved to a position where the second hinge portion 12 can be inserted into a gap between the first hinge receiving portion 21 and the second hinge receiving portion 22 of the package tray 2, the position being indicated by the dotted line DL1. Subsequently, the second hinge portion 12 is inserted into the gap between the first hinge receiving portion 21 and the second hinge receiving portion 22, and the second hinge receiving portion 22 is brought into abutment with the second hinge portion 12. Since the first hinge portion 11 becomes the center of rotation of the package tray 2, it is possible to move the first hinge receiving portion 21 along the outer peripheral surface of the first hinge portion 11 and the second hinge receiving portion 22 along the second arc surface 12b of the second hinge portion 12, only by moving down the vehicle rear-side end portion of the package tray 2 from the above state. Accordingly, the package tray 2 can be brought into the horizontal position by an easy operation. Note that the package tray 2 can be maintained in the horizontal position by being supported by the support portion 1a of the deck side trim 1.

Figure 8:
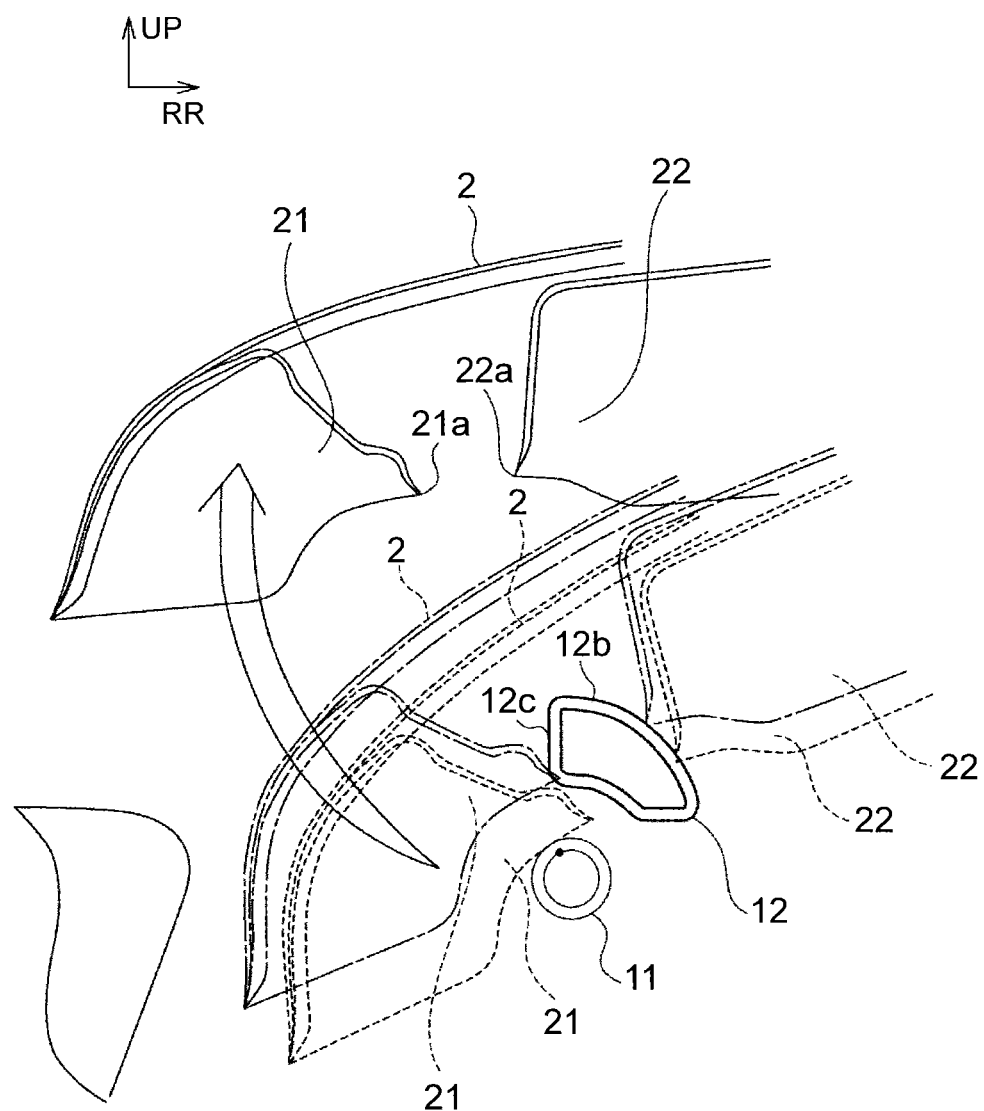
FIG. 8 is an enlarged view illustrating a portion surrounded by a circle with an alternate long and short dash line in FIG. 7.

Next, an action of releasing an external force on the package tray 2 when the backdoor 3 is closed from a fully-open state in a case in which the height position of the luggage P loaded in the luggage compartment is higher than the position of the axis center $X_1$ of the first hinge portion 11 will be described below based on FIGS. 7, 8. Note that a vehicle described here is of a type in which the backdoor 3 has a gentle inclination angle. In FIGS. 7, 8, the package tray 2 indicated by a dotted line represents the inclined position in a state in which the package tray 2 is locked to an upper surface of the luggage P, the package tray 2 indicated by an alternate long and short dash line represents movement of the package tray 2 immediately after the vehicle rear-side end portion of the package tray 2 is pushed when the backdoor 3 is closed, and the package tray 2 indicated by a solid line represents movement of the package tray 2 when the backdoor 3 is fully closed.

In the case of the package tray 2 indicated by the dotted line representing the inclined position in a state in which the package tray is locked to the upper end portion Y of the luggage P, the backdoor 3 applies an external force to the vehicle rear-side end portion of the package tray 2 downwardly from above when the backdoor 3 is closed from the fully-open state. As in the package tray 2 indicated by the alternate long and short dash line, in the package tray 2 immediately after the backdoor 3 pushes the vehicle rear-side end portion of the package tray 2, the vehicle rear-side end portion of the package tray 2 works as a point of effort, the upper end portion Y of the luggage P with which the package tray 2 is in abutment works as a fulcrum, and the vehicle front-side end portion of the package tray 2 works as a point of load. Thus, the vehicle front-side end portion of the package tray 2 starts to be disengaged from the first hinge portion 11 and the second hinge portion 12 with the upper end portion Y of the luggage P with which the package tray 2 is in abutment as a fulcrum according to the principle of leverage.

To be more specific, the claw distal end portion 22a of the second hinge receiving portion 22 of the package tray 2 slides upward on the second arc surface 12b of the second hinge portion 12. In addition, the claw distal end portion 21a of the first hinge receiving portion 21 separates from the first hinge portion 11, and moves toward a lower end of the cut surface 12c on the left side of the second hinge portion 12.

Moreover, when the backdoor 3 is brought into a fully-closed state by a closing action, the vehicle front-side end portion of the package tray 2 is completely disengaged from the first hinge portion 11 and the second hinge portion 12 with the upper end portion Y of the luggage P with which the package tray 2 is in abutment as a fulcrum according to the principle of leverage. To be more specific, the claw distal end portion 22a of the second hinge receiving portion 22 of the package tray 2 separates from the second arc surface 12b of the second hinge portion 12, and the claw distal end portion 21a of the first hinge receiving portion 21 separates from the cut surface 12c on the left side of the second hinge portion 12.

That is, the minimum interval between the first hinge receiving portion 21 and the second hinge receiving portion 22 is set such that the package tray 2 is disengaged from the first hinge portion 11 and the second hinge portion 12 with the upper end portion Y of the luggage P as a fulcrum when an external force is applied to the vehicle rear-side end portion of the package tray 2 downwardly from above. In a case in which the backdoor 3 has a gentle inclination angle, the backdoor 3 pushes the vehicle rear-side end portion of the package tray 2 when the backdoor 3 is closed. However, even when the height position of the luggage P loaded in the luggage compartment is higher than the position of the axis center of the first hinge portion 11 by a predetermined height dimension, it is possible to prevent damage to the package tray 2 in this case because the minimum interval between the first hinge receiving portion 21 and the second hinge receiving portion 22 is set such that the package tray 2 is disengaged from the first hinge portion 11 and the second hinge portion 12 with the upper end portion Y of the luggage P as a fulcrum.

Figure 9:
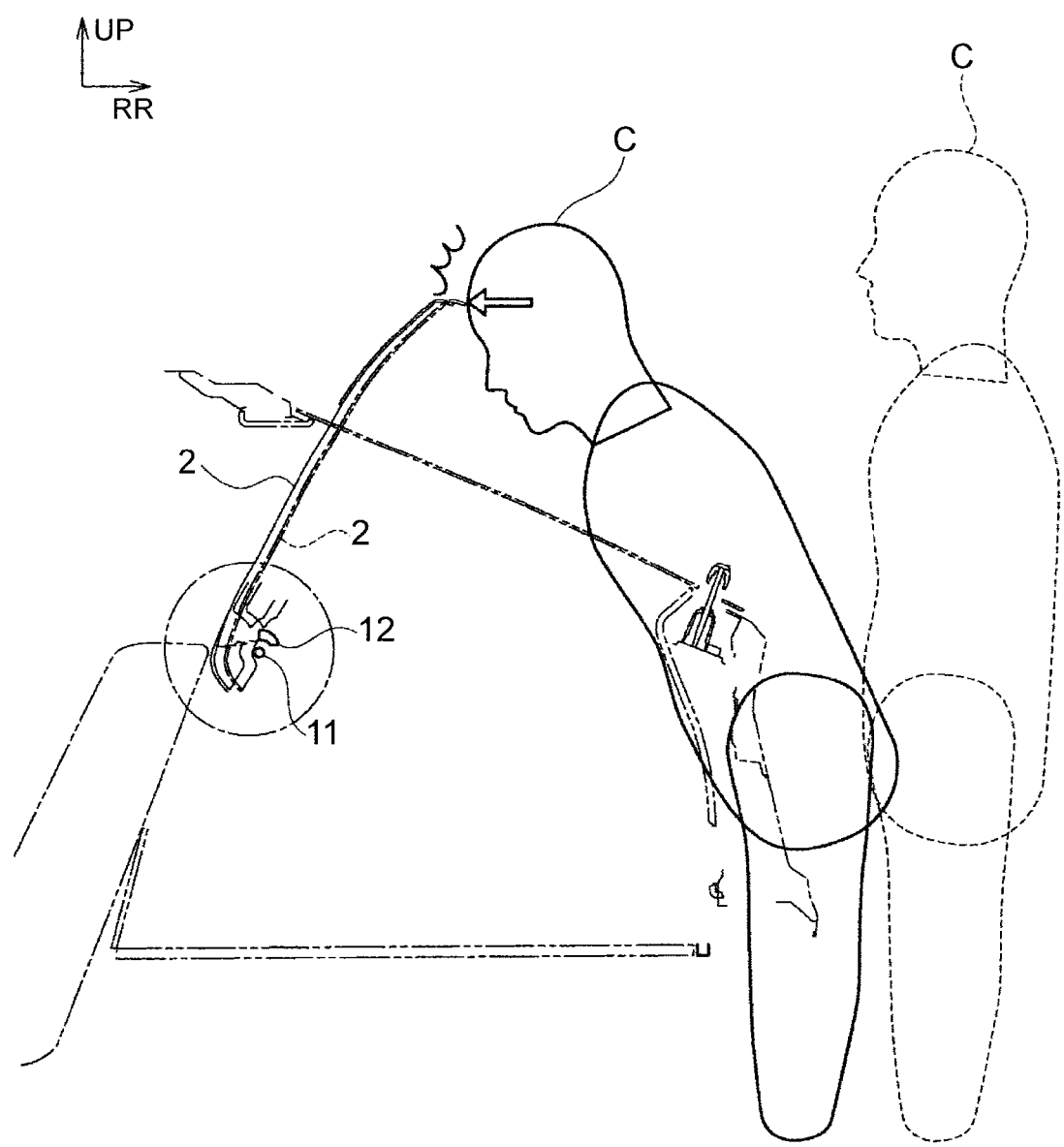
FIG. 9 is a side view simply illustrating the rear of the vehicle to which the package tray supporting structure of the invention is applied, and is a view illustrating movement of the package tray when an event occurs in which an occupant hits an object on a vehicle rear-side end portion of the package tray in the inclined position during a loading and unloading work of the luggage from the luggage compartment when the backdoor is fully opened.
Figure 10:
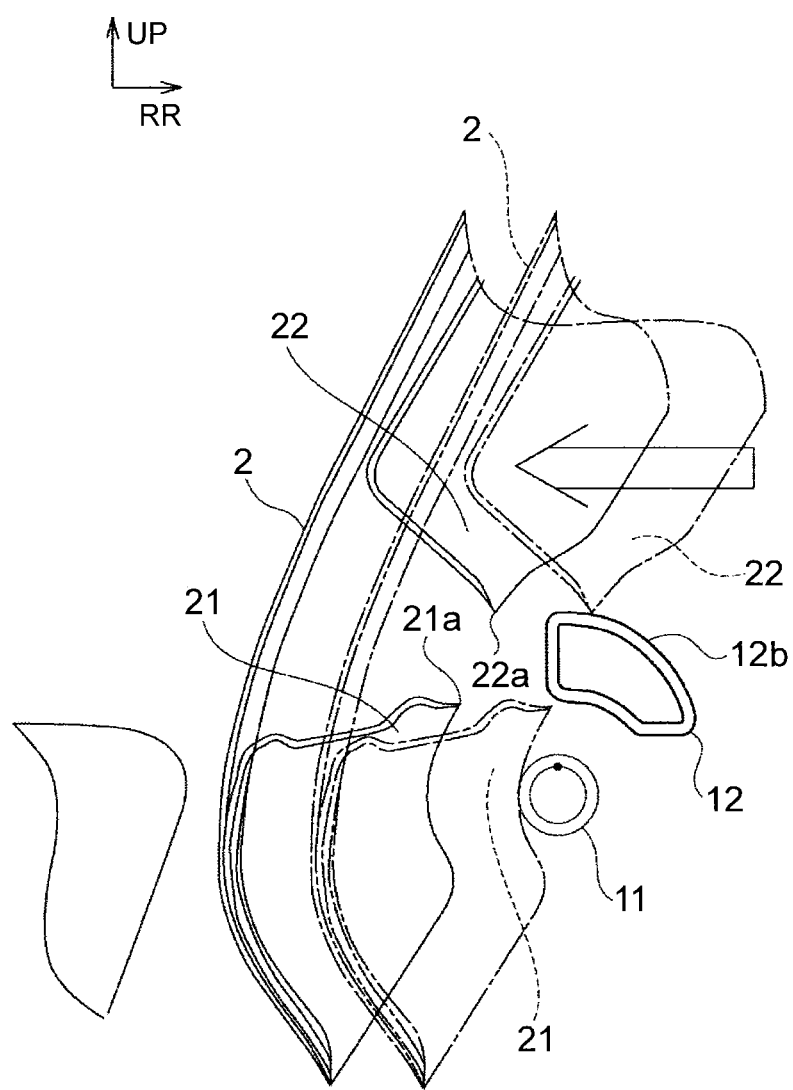
FIG. 10 is an enlarged view illustrating a portion surrounded by a circle with an alternate long and short dash line in FIG. 9.
Figure 11:
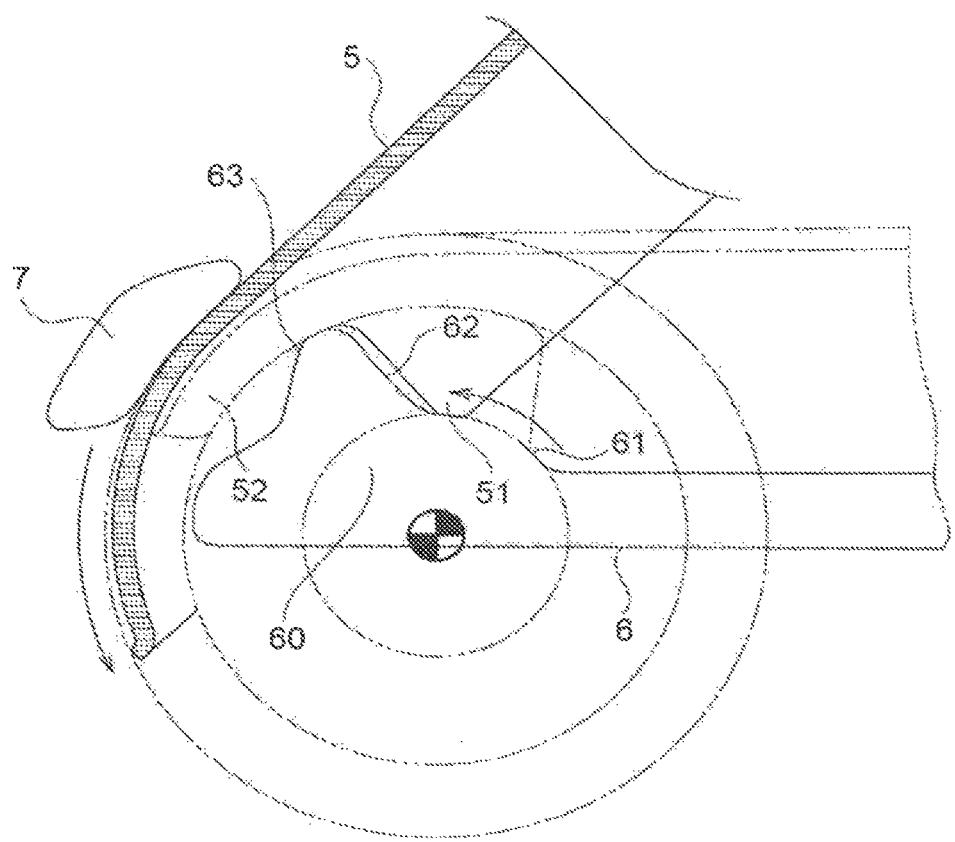
FIG. 11 is a view illustrating a package tray supporting structure as a related drawing, and is a side view of a front end of a side edge portion of a package tray.
Figure 12:
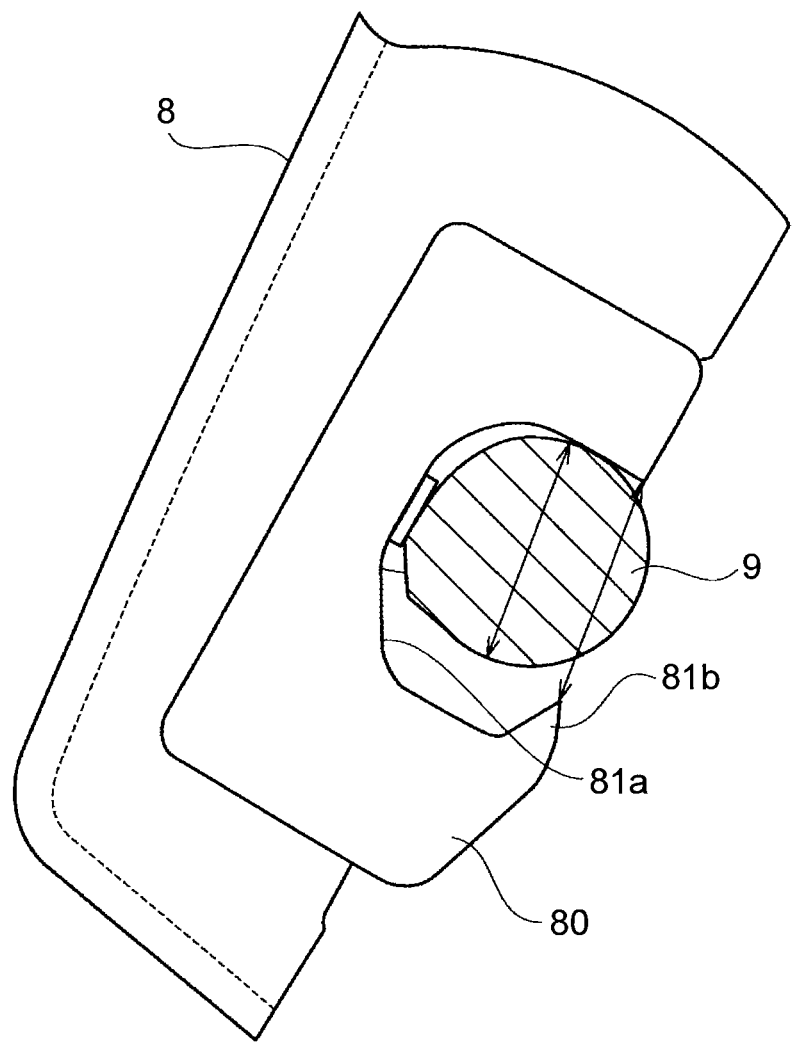
FIG. 12 is a view illustrating a package tray mounting structure as a related drawing, and is a side view around a hinge collar.

Lastly, an action of releasing an external force on the package tray 2 in a case where an occupant C hits an object on the vehicle rear-side end portion of the package tray 2 during a loading and unloading work of the luggage (not shown) from the luggage compartment will be described based on FIGS. 9, 10. In this case, the backdoor 3 is fully opened. In FIGS. 9, 10, the package tray 2 indicated by an alternate long and short dash line represents the inclined position, and the package tray 2 indicated by a solid line represents movement of the package tray 2 when the occupant C hits the object on the vehicle rear-side end portion of the package tray 2 in the inclined position.

First, when the package tray 2 is in the inclined position, the claw distal end portion 22a of the second hinge receiving portion 22 is in abutment with the second arc surface 12b of the second hinge portion 12 on a left upper side, and the claw distal end portion 21a of the first hinge receiving portion 21 is not in abutment with the first arc surface 12a of the second hinge portion 12 on a left upper side. If the occupant C hits the object on the vehicle rear-side end portion of the package tray 2 in the above state, the external force is also transmitted to the vehicle front-side end portion from the vehicle rear-side end portion of the package tray 2. Thus, the claw distal end portion 22a of the second hinge receiving portion 22 in abutment with the second arc surface 12b of the second hinge portion 12 on the left upper side is disengaged from the second arc surface 12b, and the claw distal end portion 21a of the first hinge receiving portion 21 not in abutment with the first arc surface 12a of the second hinge portion 12 on the left upper side is also disengaged from the first arc surface 12a.

That is, when the package tray 2 is in the inclined position, it is possible to prevent damage to the package tray 2 since the gap between the first hinge receiving portion 21 and the second hinge receiving portion 22 is formed so as to be located in a direction in which the package tray 2 can be disengaged toward the vehicle front side from the second hinge portion 12.

Although the invention has been described above based on the particular embodiment shown in the drawings, the invention is not limited to the embodiment shown in the drawings, and it goes without saying that any known configuration can be employed as long as the effect of the invention is produced. For example, the first hinge portion 11 may have a column shape with an approximately semicircular shaped base. Further, the second hinge portion 12 may have a curved surface other than an arc surface.

What is claimed is:

1. A package tray supporting structure for supporting a package tray pivotally with respect to a vehicle body side between a horizontal position and a predetermined inclined position, the package tray hiding luggage that is loaded in a luggage compartment provided behind a rear seat, each of opposite side surface portions on a vehicle front side of the package tray being pivotally mounted to the vehicle body, the package tray being disposed along a horizontal direction in the horizontal position, and a vehicle rear-side end portion of the package tray being disposed at a higher position than a vehicle front-side end portion of the package tray in the predetermined inclined position, the package tray supporting structure comprising:
    a first hinge portion that is provided on the vehicle body side, and projects to a vehicle interior side;
    a second hinge portion that is provided on the vehicle body side, and projects to the vehicle interior side, the second hinge portion including
        a first surface that is provided separately from the first hinge portion above the first hinge portion, and
        a second surface that is located more separately from the first hinge portion than the first surface;
    a first hinge receiving portion that is provided at the side surface portion on the vehicle front side of the package tray, and is held between the first surface and an outer peripheral surface of the first hinge portion when the package tray is in the horizontal position; and
    a second hinge receiving portion that is provided at the side surface portion on the vehicle front side of the package tray separately from the first hinge receiving portion toward a vehicle rear side, the second hinge receiving portion being in abutment with the second surface when the package tray is in the horizontal position, wherein
    the second hinge portion is configured to allow the package tray to be disengaged from the first hinge portion and the second hinge portion when the package tray is rotated to the inclined position from the horizontal position.

2. The package tray supporting structure according to claim 1, wherein
    the first hinge receiving portion is provided so as to continuously slides on the outer peripheral surface of the first hinge portion when the package tray performs a pivoting action between the horizontal position and the inclined position, and
    the second hinge receiving portion is provided so as to continuously slides on the second surface when the package tray performs the pivoting action between the horizontal position and the inclined position.

3. The package tray supporting structure according to claim 2, wherein
    the first hinge portion has a cylindrical shape,
    the second hinge portion has a substantially fan shape having a center angle of predetermined magnitude,
    the first surface has an arc surface shape, and
    the second surface has an arc surface shape that has a larger radius than that of the arc surface shape of the first surface.

4. The package tray supporting structure according to claim 3, wherein
    an axis center of the first hinge portion and an arc center of the first surface are set to be concentric with each other, and a position of an arc center of the second surface is set to be higher than a position of the arc center of the first surface.

5. The package tray supporting structure according to claim 3, wherein
    a minimum interval between the first hinge receiving portion and the second hinge receiving portion is set such that the package tray is disengaged from the first hinge portion and the second hinge portion with an upper end portion of the luggage as a fulcrum when an external force is applied to the vehicle rear-side end portion of the package tray downwardly from above in a case in which a height position of the luggage is higher than a position of an axis center of the first hinge portion by a predetermined height dimension.

* * * * *